United States Patent [19]

Verri et al.

[11] Patent Number: 4,533,472

[45] Date of Patent: Aug. 6, 1985

[54] PRESSURE FILTER WITH A TUBULAR, FLEXIBLE FILTER ELEMENT WHICH CAN BE TURNED INSIDE OUT

[75] Inventors: Vittorio Verri; Renato Christiani, both of Milan, Italy

[73] Assignee: Comber S.p.A. Costruzioni Meccaniche Bergamasche, Italy

[21] Appl. No.: 556,192

[22] Filed: Nov. 29, 1983

[51] Int. Cl.³ .............................................. B01D 29/42
[52] U.S. Cl. ..................................... 210/350; 100/211
[58] Field of Search .................... 210/232, 416.1, 350, 210/351, 391, 398; 100/211

[56] References Cited

U.S. PATENT DOCUMENTS 3,753,499  8/1973  Gwilliam ............................. 210/350
4,246,122  1/1981  Keat .................................... 210/350

Primary Examiner—Barry S. Richman
Assistant Examiner—John Donofrio
Attorney, Agent, or Firm—Robbins & Laramie

[57] ABSTRACT

A pressure filter in which the filter element is constituted by a tubular fabric which can be turned inside-out like a stocking. A tubular membrane closed at opposite ends, and inflatable and resiliently deformable radially, is supported coaxially within the filter element. By means of this membrane it is possible to squeeze fully the layer of solid material held on the filter after filtration of a turbid liquid or the like.

1 Claim, 3 Drawing Figures

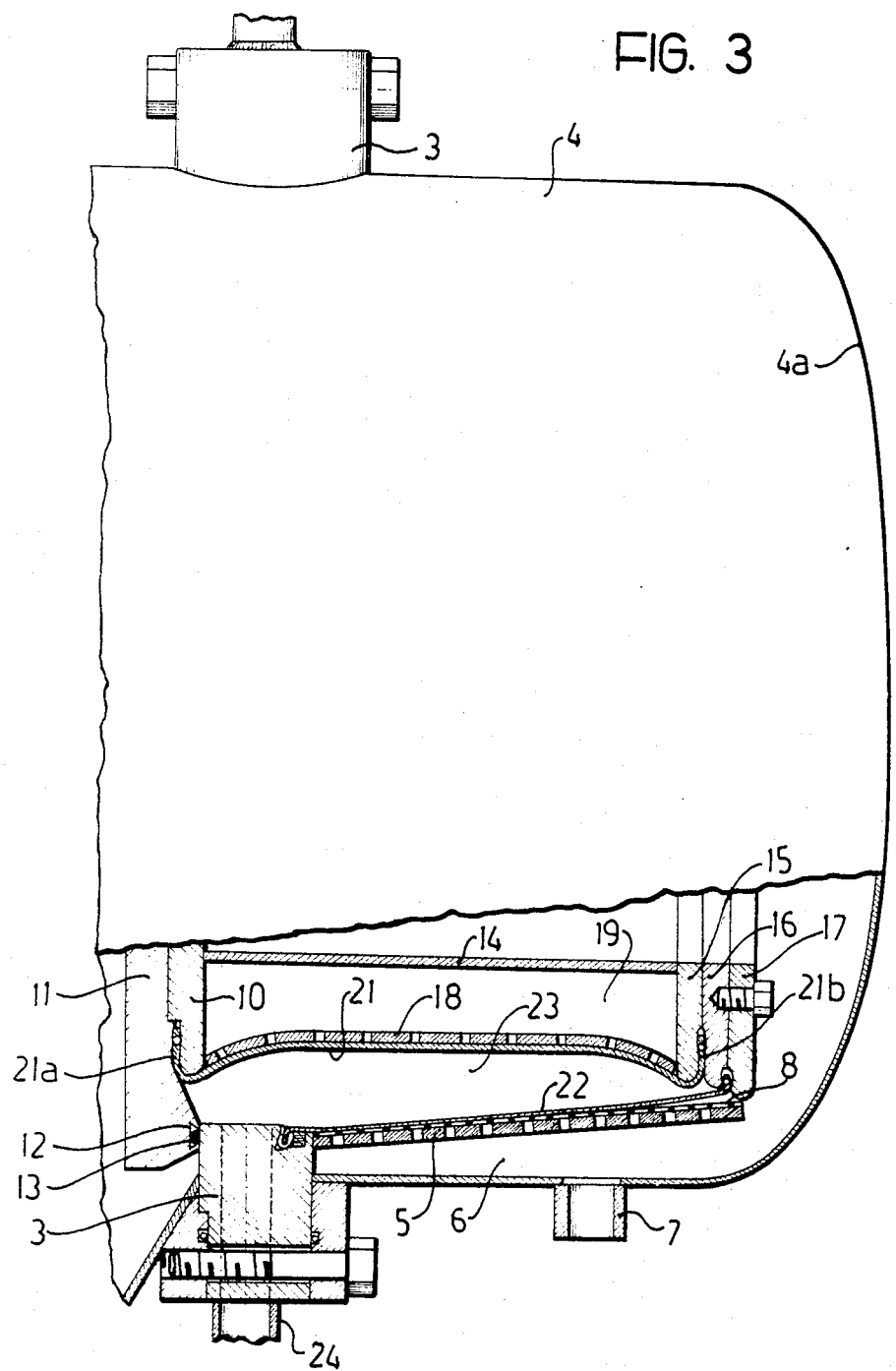

PRESSURE FILTER WITH A TUBULAR, FLEXIBLE FILTER ELEMENT WHICH CAN BE TURNED INSIDE OUT

This invention relates to a pressure filter of the type in which the filter element, which is constituted essentially by a tubular fabric, is supplied from the inside with a turbid liquid or suspension to be filtered and, once filtration is finished, is turned inside out like a stocking so that the residual layer formed on the filter may be removed quickly and easily. A pressure filter of this type obviously functions discontinuously and is known in the art as a pulsatory filter.

With regard to the filtering of turbid liquids or suspensions and the like, particularly with the use of discontinuously operating filters, the following technical requirements are well known:

thorough separation of the solid from the liquid, quick, easy and complete removal of the solid retained on the filter, high filter yield expressed as the quantity of turbid liquid filtered per unit time.

Among the numerous filtering devices made and used up to now for this purpose those which have been recognised as successful from the point of view of satisfying the technical requirements set out above have a tubular filter which can be turned inside-out like a stocking.

Moreover, in order to increase the degree of separation of the liquid from the solid suspended therein, the said filtering devices have been made with structural and functional characteristics such that, at the end of a first filtering stage of the turbid liquid, it is possible to centrifuge the residual layer retained on the tubular filter.

With regard to this device it should be noted that, while on the one hand the degree of liquid-solid separation achieved by centrifuging does not reach the expected desired values, on the other hand the devices themselves are known to have considerable structural and functional complications and, among other things, require frequent maintenance and adjustment.

The problem at the root of this invention is that of providing a pressure filter of pulsatory type, as specified above, which achieves a greater degree of liquid-solid separation than the known art or, as it is usually put in this branch of the art, a greater degree of squeezing of the residual layer retained on the filter, while at the same time having structural and functional characteristics which are considerably simpler than those of similar filters of the known art, in which the squeezing of the residue is achieved by centrifuging.

This problem is solved according to the invention by a pressure filter for filtering turbid liquids and like suspensions in which the filter element is constituted essentially by a tubular fabric which can be turned inside-out like a stocking, characterised in that it includes a tubular membrane closed at opposite ends and resiliently radially deformable, supported coaxially within the filter element with which it defines an annular chamber in liquid communication with a duct for supplying the turbid suspension to be filtered, at least one further duct being provided for supplying and discharging a pressurised fluid into and from the tubular membrane.

The main advantage achieved by a pressure filter in accordance with this invention resides in the fact that the feeding of a fluid under pressure, for example compressed air, into the tubular membrane (inflating it) makes it possible to exert a pressure over the entire residual layer retained by the filter, achieving an efficient squeezing action on the layer which has not been achieved by similar filters of the known art until now.

A further not insignificant advantage is constituted by the considerable structural simplifications presented by a filter according to the invention, relative to those of the known art. Indeed in this filter there are no rotary parts and hence there is no need to use joints and/or other delicate mechanical connections which are complicated to form and not very strong in operation in the presence of turbid liquids and like suspensions.

The characteristics and advantages of a pressure filter of the so-called pulsatory type according to the invention will become clearer from the detailed description which follows of one embodiment, made below with reference to the appended drawings, given purely by way of non-limiting example, in which:

FIG. 3 shows a detail of FIG. 1 on an enlarged scale.

Figure 1:
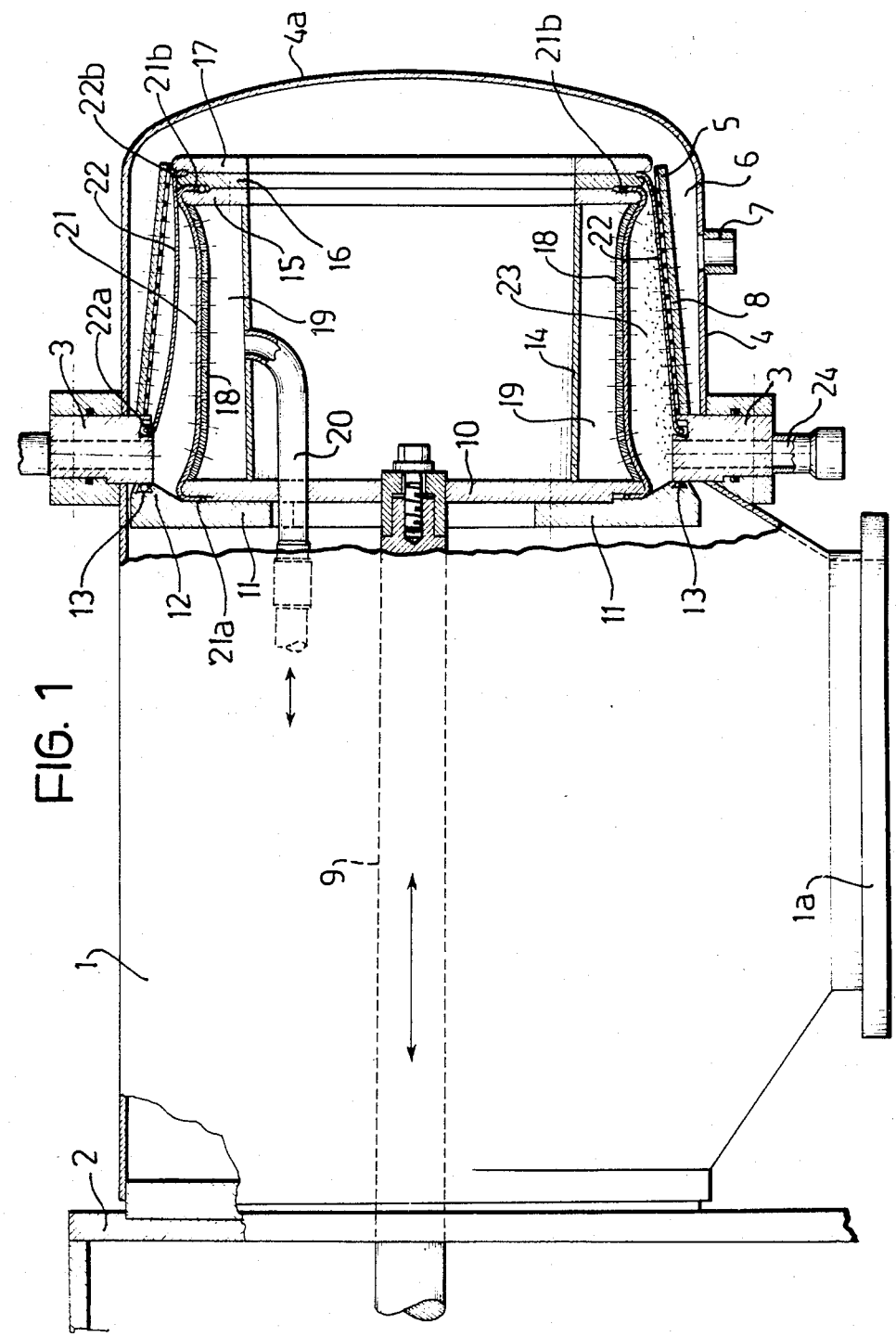
FIG. 1 is a schematic side elevational view, in partial section, of a filter according to the invention in the condition of "filtering" a turbid liquid.

With reference to the said drawings, a pressure filter of the so-called pulsatory type according to the invention includes a casing body 1 fixed by conventional means, not shown, so as to project from a support schematically shown at 2. To the free end of the casing body 1 there is fixed an annular flange 3 to which a cylindrical head 4 having a rounded base 4a is releasably fixed by conventional means not shown. A perforated basket 5 is fixed to the annular flange 3 and extends coaxially within the cylindrical head 4 and preferably tapers towards the rounded base 4a thereof. Between the basket 5 and the head 4 is a considerable space 6 which communicates with the exterior of the head 4 through a pipe 7.

Within the basket 5 and in contact with its inner wall is a metallic mesh 8.

A shaft 9 extends along the axis of the cylindrical head 4 and is supported by conventional means not shown, within the casing body 1. The shaft 9 is movable axially by means of for example, an hydraulic actuator (not shown). In this case the shaft 9 could itself constitute the shaft of the hydraulic actuator.

A circular plate 10 is releasably mounted on the free end of the shaft 9, near the head 4. A second annular plate 11 is fixed coaxially to the plate 10 on that side thereof facing the casing body 1 and has an external diameter greater than the diameter of the plate 10 referred to above.

A circumferential groove 12 is formed in the plate 11 for receiving an annular washer 13 which makes contact with the annular flange 3 to effect a pressurised liquid-tight seal (FIG. 1).

A cylindrical sleeve 14 is fixed coaxially on the plate 10 and extends towards the rounded base 4a of the head 4. At the free end of the cylindrical sleeve 14 are releasably and coaxially fixed three annular flanges 15, 16 and 17 arranged in a pack.

The circular plate 10 and the annular flange 15 support a perforated basket 18 coaxial with and outside the sleeve 14, with which it forms an annular interspace 19, in fluid communication with a source of pressurised fluid (for example compressed air) through a pipe 20.

A tubular membrane 21, preferably of rubber of a suitable thickness and with appropriate characteristics of resilience, has one end 21a releasably clamped between the circular plate 10 and the annular plate 11 while the other end 21b is similarly releasably clamped between the flanges 15 and 16 mentioned above. The membrane 21 is mounted outside and coaxial with the perforated basket 18 on which it is stretched under normal conditions.

A tubular filter fabric 22 has one end 22a releasably locked on the annular flange 3 and the other end 22b releasably clamped between the flanges 16 and 17. Between the tubular membrane 21 and the tubular filter fabric 22 is an annular chamber 23 which is in communication with a duct 24 for supplying turbid liquid to be filtered.

This duct 24 is preferably formed radially in the annular flange 3.

The operation of the pressure filter described above is as follows.

In an initial condition, the pressure filter according to the invention is in the configuration shown in FIG. 1. The annular plate 11 is pressed against the annular flange 3 by the action of the hydraulic actuator on the shaft 9 and sealing against the pressurised liquid is effected by the annular washer 13.

The perforated basket 18 and its tubular membrane 21 are in the inserted position within the perforated basket 5 and its tubular fabric 22.

A turbid liquid to be filtered is supplied under predetermined pressure through the duct 24 into the annular chamber 23 where it starts to filter through the fabric 22 and the perforated basket 5. The filtered liquid is gradually collected in the space 6 from which it is discharged through the drain 7 while the (valued) substance contained in the turbid liquid is retained by the filter fabric 22, gradually forming a residual layer on its inner wall. After the supply of turbid liquid through the duct 24 has been stopped and the filtered liquid also ceases to be discharged through the pipe 7, air under pressure is passed into the annular space 19 and, passing through the perforated basket 18, inflates the membrane 21. This membrane, deforming radially, presses on the residue retained by the filter fabric 22 and the pressure may be increased gradually up to the desired value, by suitable increase of the pressure of the air supplied.

Thus a gradually increasing pressing action is exerted by the membrane 21 on the residual layer mentioned above, consequently effecting the squeezing of this layer until values considerably greater than those reached by filters of the known art, based on a centrifuging action, are achieved.

During this squeezing, further filtered liquid is discharged through the pipe 7 and when this flow stops the end of the filtering stage previously undertaken is signified.

At this point air is discharged from the membrane 21 until the latter takes up its position in contact with the perforated basket 18 again and by operation of the hydraulic actuator which acts on the shaft 9 this shaft is removed from the head 4, consequently removing the basket 18 and the flanges 15, 16 and 17 and the tubular membrane 21.

Figure 2:
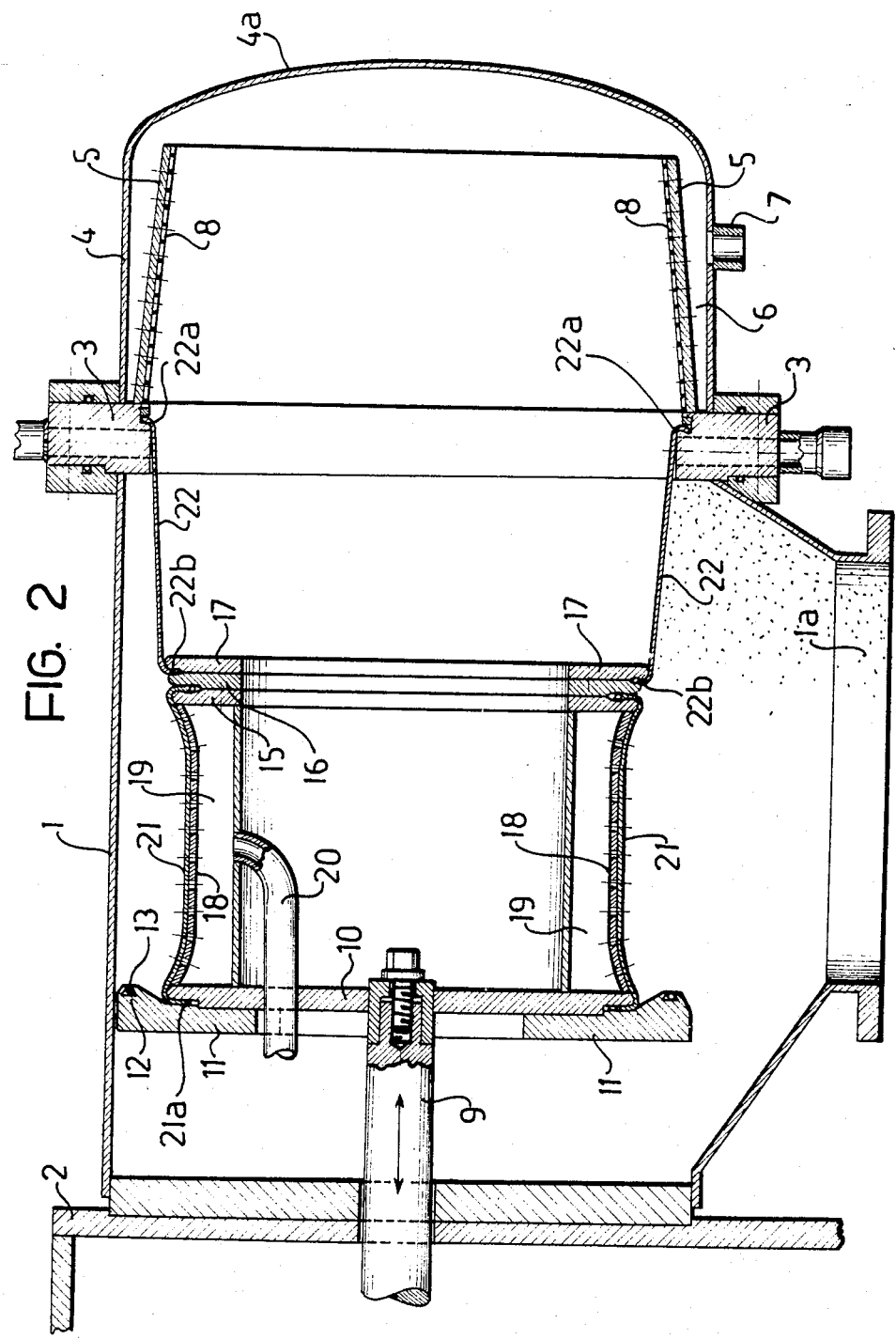
FIG. 2 shows the filter of FIG. 1 in the condition of removal of the residual layer retained by the filter.

This axial movement turns the filter fabric 22 inside out like a stocking (FIG. 2) and with this turning the substance separated from the turbid liquid is recovered completely, easily and rapidly in known manner.

This substance is discharged from the casing body 1 through an aperture 1a formed in the lower part thereof.

What is claimed is:
1. Pressure filter, particularly for filtering turbid liquids and like suspensions, comprising in combination:
   a first frusto-conical, perforated basket having a smaller open end and a larger open end; a second perforated basket;
   means supporting the second basket coaxially within the first basket and for guiding the second basket for axial movement from a position of insertion within the first basket to a position spaced therefrom;
   a tubular, frusto-conical fabric having a smaller open end and a larger open end, said fabric positioned coaxially between the baskets and fixed at its larger end to the larger end of the first basket and at its smaller end to the second basket;
   a tubular membrane, mounted coaxially on the second basket, said tubular membrane being resiliently radially deformable and defining an annular chamber between itself and the tubular fabric when the second basket is in its inserted position within the first basket;
   an inner sleeve positioned within the second basket forming a closed inner annular chamber with the tubular membrane;
   at least one duct for supplying a turbid liquid to the annular chamber;
   at least one duct for discharging the filtered liquid from the side of said fabric opposite said annular chamber; and
   at least one duct for the supply of a pressurised fluid into said closed inner annular chamber.

* * * * *